US011977595B1

(12) United States Patent
Warnick et al.

(10) Patent No.: US 11,977,595 B1
(45) Date of Patent: May 7, 2024

(54) QUERY ENGINE SYSTEM AND METHOD

(71) Applicant: United Services Automobile Association (USAA), San Antonio, TX (US)

(72) Inventors: Mark Paxman Warnick, San Antonio, TX (US); Elena Marie Carrasco, Converse, TX (US); Nolan Serrao, Plano, TX (US); Ravi Durairaj, San Antonio, TX (US); Joel S. Hartshorn, Port Orchard, WA (US); Jeanie Graciela Lopez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/855,207

(22) Filed: Jun. 30, 2022

(51) Int. Cl.
| | |
|---|---|
| *G06F 7/02* | (2006.01) |
| *G06F 16/00* | (2019.01) |
| *G06F 16/951* | (2019.01) |
| *G06F 16/9538* | (2019.01) |
| *G06F 16/957* | (2019.01) |

(52) U.S. Cl.
CPC ........ *G06F 16/9538* (2019.01); *G06F 16/951* (2019.01); *G06F 16/9577* (2019.01)

(58) Field of Classification Search
CPC .. G06F 16/9538; G06F 16/9577; G06F 16/95; G06F 16/951
See application file for complete search history.

(56) References Cited

U.S. PATENT DOCUMENTS

| | | | | |
|---|---|---|---|---|
| 2012/0253943 | A1* | 10/2012 | Chow | G06Q 30/0255 705/14.69 |
| 2016/0350419 | A1* | 12/2016 | Tao | G06F 16/951 |
| 2020/0065397 | A1* | 2/2020 | Goenka | G06F 16/1834 |
| 2020/0242182 | A1* | 7/2020 | Gokyigit | G06N 20/00 |

\* cited by examiner

*Primary Examiner* — Bruce M Moser
(74) *Attorney, Agent, or Firm* — Fletcher Yoder, PC

(57) ABSTRACT

A system includes a processor and a database having first data indexed therein and indicative of a plurality of online websites. The processor is configured to receive, via a search engine account, second data indicative of a search string. The processor is also configured to determine an additional online account linked with the search engine account, and locate, in the additional online account and based on the second data, third data correlated to the search string. The processor is also configured to search the database to locate a subset of the first data by identifying a correspondence between the subset of the first data and a combination of the second data and the third data. The processor is also configured to format, based on the subset of the first data, search results displayable on a display of a user device.

20 Claims, 5 Drawing Sheets

QUERY ENGINE SYSTEM AND METHOD

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Search engines are employed to enable a user to locate information stored in one or more databases. For example, the search engine may periodically download information from various sources and index the information in the one or more databases. This procedure may be traditionally referred to as "crawling." A user may utilize an electronic input component associated with an electronic user device to enter a search term (e.g., a string) to a search engine input section displayed on the electronic user device. The search engine may utilize the search term to identify related information stored in the one or more databases, determine search results, and present the search results on the electronic user device corresponding to the user.

Traditional search engines may employ limited search criteria. For example, traditional search engines may merely employ the search string, and possibly location information corresponding to the electronic user device, to identify the related information stored in the one or more databases. Based on these limitations, traditional search engines often output search results that are inaccurate and/or incomplete. Accordingly, it is now recognized that improved search engine technology is desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors and one or more databases having first data indexed indicative of a plurality of online websites indexed therein. The one or more processors is configured to receive, via an input section corresponding to a search engine account of a search engine application operable on a user device, second data indicative of a search string. The one or more processors is also configured to determine an additional online account linked with the search engine account, and locate, in the additional online account and based on the second data, third data correlated to the search string. The one or more processors is also configured to search the one or more databases to locate a subset of the first data by identifying a correspondence between the subset of the first data and a combination of the second data and the third data. The one or more processors is also configured to format, based on the subset of the first data, search results displayable on a display of the user device.

In one embodiment, a computer-implemented method includes connecting, via at least one processor, a first online account corresponding to a search engine application with a second online account. The computer-implemented method also includes receiving, via the at least one processor and from the first online account corresponding to the search engine application, data indicative of a search string. The computer-implemented method also includes querying, via the at least one processor, the second online account for content related to the data indicative of the search string. The computer-implemented method also includes searching, via the at least one processor, a web database to determine search results based on the data indicative of the search string and the content related to the data indicative of the search string. The computer-implemented method also includes generating, via the at least one processor, a graphical user interface comprising the search results.

In one embodiment, one or more tangible, non-transitory, computer-readable media includes instructions stored thereon that, when executed by one or more processors, are configured to cause the one or more processors to perform various functions. The functions include receiving, via an input section of a search engine account corresponding to a search engine, data indicative of a search string. The functions also including querying a device or an account connected with the search engine account for content related to the data indicative of the search string. The functions also include searching a web database to determine search results based on the data indicative of the search string and the content related to the data indicative of the search string. The functions also include generating, in a search results interface of the search engine account corresponding to the search engine, a graphical user interface presenting the search results.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
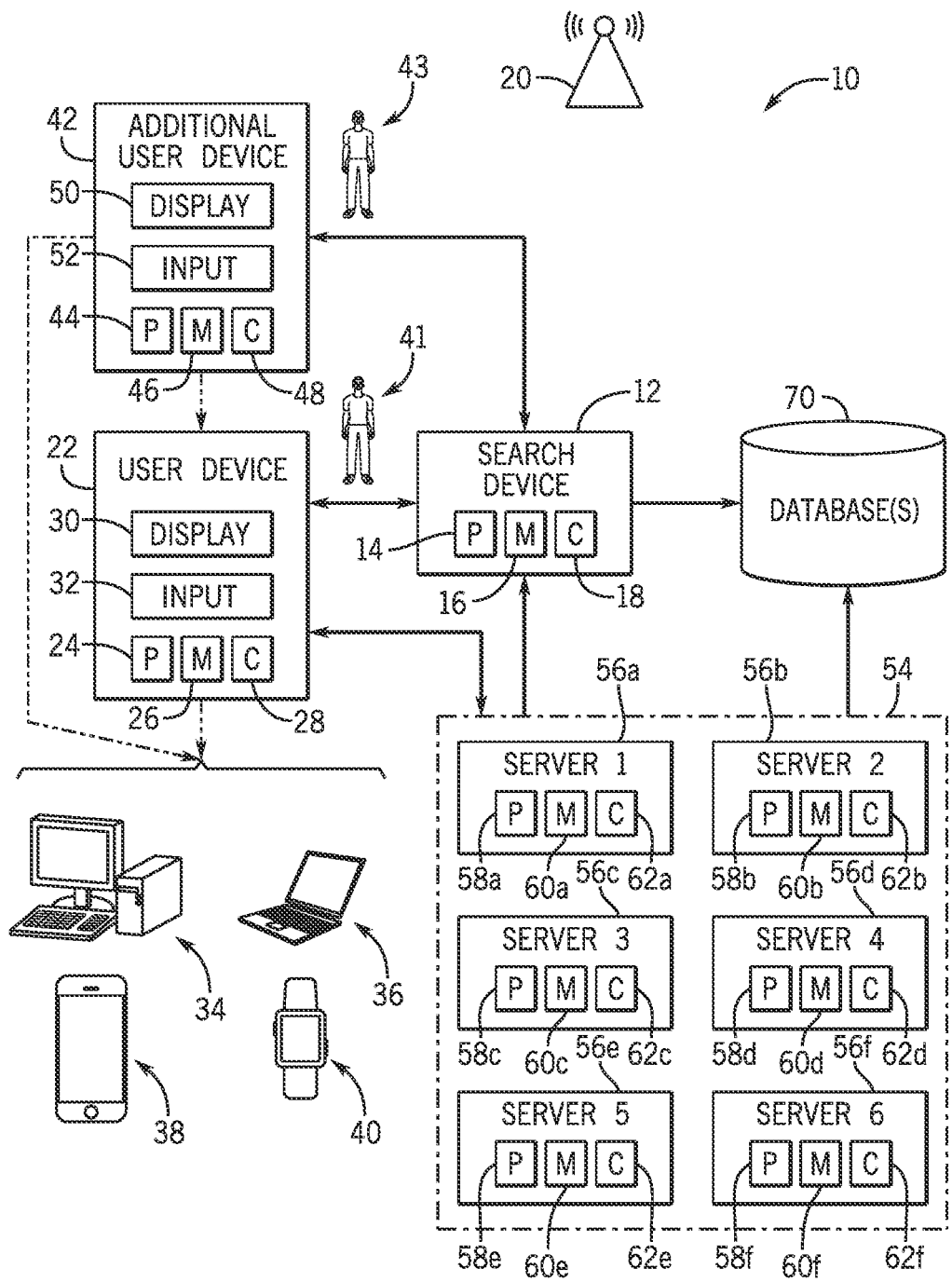
FIG. 1 is a schematic illustration of a search engine computing assembly, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to search (or query) engine systems and methods. More particularly, the present disclosure relates to systems and methods that employ a search term (e.g., string) and other data points to locate relevant information in the context of a search (or query) engine. Present embodiments may modify initial searches or queries based on supplemental data from available data wells authorized for application access. For example, a user may authorize use of insurance data and/or banking data to increase searching relevance (e.g., provide results that correspond with lifestyle data monitored for insurance purposes or results that correspond with budgeting data monitored for banking purposes). Further, information may be shared between accounts. For example, search information may be pulled from a banking or insurance account and/or provide thereto. As a specific example, previous payment information for a particular good or service may be provided from a user's bank account based on a query related to the good or serve to help the user gauge value and past experience of the user with the good or service.

In accordance with the present disclosure, a search engine computing assembly includes a search device, a user device, and a database. The database may include information downloaded or otherwise stored thereon from various sources, such as websites accessible on the Internet, and indexed in the database for ease of searching. The search device may receive a search term (e.g., a word, a phrase, a string, Boolean logic, etc.) from the user device, which may include a personal computer, a laptop, a smartphone, a smartwatch, or the like. For example, the user may enter the search term to a search engine account corresponding to a search engine application and presented on the user device. The search device may also receive supplemental input related to user activity (e.g., number of steps taken per day, financial savings goals) for use in better narrowing search results to items of interest to the user.

In accordance with the present disclosure, the search device receives one or more additional data points (e.g., additional inputs) utilized by the search device to contextualize a search of the search term in the database. The one or more additional data points may include, for example, data indicative of something other than (or in addition to) location information (e.g., location information derived from a Global Position System [GPS], location information derived from an Internet Protocol [IP] address). For example, the search device may receive the one or more additional data points via an additional search engine account corresponding to an additional user having a connection (or linkage) with the search engine account of the user, from an additional user device corresponding to the additional user, from a separate account (e.g., separate online account) corresponding to the user (e.g., a social media account of the user, a financial institution account of the user, a retail account of the user, a calendaring or scheduling app of the user, a health/fitness/nutrition account, etc.), from a separate account corresponding to the additional user (e.g., a social media account of the additional user, a financial institution account of the additional user, a retail account of the additional user, a calendaring or scheduling app of the additional user, etc.), or another source of information. In some embodiments, the search device may locate the additional data points (e.g., additional inputs) in response to receiving the search term from the user device corresponding to the user. That is, the search device may receive the search term from the user device corresponding to the user, and then locate, in response to receiving the search term, additional and/or related data points (e.g., additional inputs) stored in, for example, the additional user device of the additional user.

As an example, the search term received from the user device corresponding to the user may include "trustworthy barber shops," and the search device may locate, in a scheduling or calendaring app corresponding to the additional user device, barber shop appointments at a particular barber shop utilized by the additional user. Further, the search device may employ the search term and the one or more additional data points to search the aforementioned database for relevant information. For example, the search device may locate a website corresponding to the particular barber shop utilized by the additional user, in addition to additional websites of other barber shops in a location corresponding to the user device. The search device may also receive and/or identify payment information through a user's bank account corresponding to previously utilized barber shops or the same barber shop.

In accordance with the present disclosure, the search device may determine, calculate, or assign relevancy scores to the identified information in the database. For example, the search device may determine a first relevancy score corresponding to the website of the barber shop utilized by the additional user described above, and a second relevancy score corresponding another website of another barber shop, where the first relevancy score is higher than the second relevancy score based on its association with the additional user (e.g., via the above-described appointments of the additional user at the barber shop or based on a previously identified payment to the barber shop).

In some embodiments, the search engine may weight the search string and the additional data points differently in determining the relevancy scores of identified information in the database, or alternatively weight the additional data points based on how closely the additional data points relate to the search string. As an example, in instances where the additional user had scheduled multiple appointments with the barber shop over time, the weight or priority of the additional data points relating to the barber shop appointments may be increased and the weight or priority of the search string may be decreased. In this way, a first portion (e.g., a first percentage) of the relevancy score of the information identified in the database and a second portion (e.g., a second percentage) of the relevancy score of the information identified in the database may be modulated.

It should be noted that the above-described additional data point (e.g., relating to the barber shop appointment of the additional user) is merely provided as an example. Other additional data points from a variety of sources may be employed in accordance with the present disclosure, including financial information associated with an online financial account of the user or the additional user, insurance information associated with an insurance account of the user or the additional user, social media information associated with a social media account of the user or the additional user, health/fitness/nutrition information associated with a health/fitness/nutrition account of the user or the additional user, and the like. After assigning the relevancy scores to each item of identified information from the database (e.g., identified based on the search string and the additional data point[s]), the search engine may then present the search results on a display of the user device, for example, via a list of the identified information (e.g., search result items) ordered from highest relevancy score to lowest relevancy score.

In some embodiments, the search engine may prompt the user to connect various accounts and/or devices associated with the user with the search engine account corresponding to the user, including various user accounts and devices of the user, accounts and devices of family members, accounts and devices of friends, etc. In this way, the user can select which types of information can be utilized by the search device to contextualize searches (e.g., via the additional data point[s]) in scoring, preparing, and displaying search results to the user. These and other features will be described in detail below with reference to the drawings.

FIG. 1 is a schematic illustration of an embodiment of a search engine computing assembly 10. For brevity, the search engine computing assembly 10 is referred to as "the computing assembly 10" below. In the illustrated embodiment, the computing assembly 10 includes various componentry including a search device 12 having processing circuitry 14, memory circuitry 16, and communication circuitry 18. The memory circuitry 16 includes instructions stored thereon that, when executed by the processing circuitry 14, causes the processing circuitry 14 to perform various functions. The communication circuitry 18 is employed to enable the search device 12 to receive and/or transmit information. For example, in the illustrated embodiment, the search device 12 may receive and/or transmit information via the Internet 20 or some other wired or wireless communication protocol. It should be noted that the search device 12 may, in practice, include multiple instances of the search device 12 and corresponding processing circuitry 14, memory circuitry 16, and communication circuitry 18. In general, the search device 12 is configured to receive various inputs and generate search results based on the various inputs.

For example, the search device 12 is employed to receive, from a user device 22, a search term (e.g., a word, a phrase, a string, Boolean logic, or any combination thereof) and determine search results based on the search term and one or more additional inputs (or data points). The user device 22 in the illustrated embodiment includes processing circuitry 24, memory circuitry 26, communication circuitry 28, a display 30, and an input component 32 (e.g., a keyboard, a touch display, a microphone, etc.). The user device 22 may be, for example, a personal computer 34, a laptop 36, a smartphone 38, a smartwatch 40, or any other suitable user device.

The input component 32 of the user device 22 may be employed to receive the search term from a user 41 corresponding to the user device 22. The search device 12 may receive the search term from the user device 22. As will be appreciated in view of later description, the search device 12 may receive various other additional data points (or inputs) from various sources to contextualize a searching procedure carried out by the search device 12. For example, the various other inputs may relate to previous searches requested by the user device 22, location information corresponding to the user device 22, scheduling or calendaring data associated with a scheduling or calendaring app stored or executed on the user device 22, email data associated with an email app stored or executed on the user device 22, information corresponding to an additional user device 42 (and/or an additional user 43 of the additional user device 42) connected with the user device 22 (and/or the user 41 of the user device 22), other online accounts associated with the user 41 or the additional user 43 (e.g., social media accounts, financial institution accounts, insurance accounts, retail accounts, etc.), and the like.

As described above, certain additional inputs (e.g., in addition to the search term) may be received by the search device 12 from various sources. For example, the search device 12 may receive certain additional inputs (or additional data points) from the additional user device 42 which, like the user device 22, includes processing circuitry 44, memory circuitry 46, communication circuitry 48, a display 50, and an input component 52. For example, the search engine employing the search device 12 may include user accounts corresponding to various users of the search engine, including the user 41 and the additional user 43. That is, the user 41 may include a first search engine account and the additional user 43 may include a second search engine account. In some embodiments, the user 41 and the additional user 43 may agree to link or otherwise connect their search engine accounts to enable the search device 12 to employ additional data points from both the user device 22 and the additional user device 42 to perform a searching procedure. Linkages or connections between other accounts are also possible, such as a link between the search engine account of the user 41 and a separate non-search online engine account of the user 41, a link between the search engine account of the user 41 and the search engine account of the additional user 43, and/or a link between the search engine account of the user 41 and a non-search engine online account of the additional user 43.

As an example, the search device 12 may receive the search term, such as "Mexican food restaurant," from the user device 22. Further, the search device 12 may receive a second data point from the additional user device 42 (or an account associated with the additional user 43 of the additional user device 42, such as a social media account of the additional user 43) indicative of types of Mexican food, such as enchiladas, preferred by the additional user 43. The search device 12 may then employ both the search term received from the user device 22 (e.g., Mexican food restaurant), and the second data point received from the additional user device 42 or corresponding account of the additional user 43 (e.g., the enchilada preference of the additional user 43), to perform a searching procedure. As another example, the search device 12 may receive a third data point, such as an indication of a dinner appointment scheduled between the user 41 and the additional user 43 in a scheduling or calendaring app corresponding to the user 41. In this way, the search device 12 may infer a likelihood that the user 41 is seeking a Mexican food restaurant for the dinner appointment, and that the additional user 43 prefers an enchilada option at the Mexican food restaurant. Further, previous payments to Mexican food restaurants may be identified via a financial account and used to gauge how expensive a preferred restaurant would be. All of this information can be included in the searching procedure carried out by the search device 12 in order to determine relevant results and score or rank the relevant results in order of relevancy.

Other data sources besides the user device 22 and the additional user device 42 are also possible. For example, various servers of a server assembly 54 may be employed to provide additional inputs (or data points) to the search device 12 for contextualizing a search based on a search term received from the user device 22. Indeed, the above-described data points relating to the dinner appointment and/or the enchilada preference of the additional user 43 may be stored at least in part at various servers in the server assembly 54. The server assembly 54 includes, for example, a first server 56a having first processing circuitry 58a, first memory circuitry 60a, and first communication circuitry 62a, a second server 56b having second processing circuitry 58b, second memory circuitry 60b, and second communication circuitry 62b, a third server 56c having third processing circuitry 58c, third memory circuitry 60c, and third communication circuitry 62c, a fourth server 56d having fourth processing circuitry 58d, fourth memory circuitry 60d, and fourth communication circuitry 62d, a fifth server 56e having fifth processing circuitry 58e, fifth memory circuitry 60e, and fifth communication circuitry 62e, and a sixth server 56f having sixth processing circuitry 58f, sixth memory circuitry 60f, and sixth communication circuitry 62f. Reference numeral 56 may be employed below to collectively refer to the servers 56 of the server assembly 54.

It should be noted that the servers 56 of the server assembly 54 in FIG. 1 are not necessarily owned, managed, or otherwise connected by a single proprietor, but may represent any number of servers available for providing additional data points to the search device 12 and/or other purposes in the context of the presently disclosed search engine. For example, the first server 56a may correspond to a financial institution and include data indicative of an online financial account corresponding to the user 41 of the user device 22 (and/or the additional user 43 of the additional device 42), whereas the second server 56b may correspond to a social media platform and include data indicative of an online social media account corresponding to the user 41 of the user device 22 (and/or the additional user 43 of the additional device 42). In this way, various servers 56 of the server assembly 54 may be employed to provide to the search device 12 additional data points related to the search term received from the user device 22, the user 41 that entered the search term received from the user device 22, etc.

As an example of the above-described features, the user 41 may enter, as the search term and to the input component 32 of the user device 22, "houses for sale." The search device 12 receives the search term from the user device 22 and locates, based on the search term, additional data points at the first server 56a. For example, the first server 56a may host data indicative of a financial account corresponding to the user 41, and may provide to the search device 12 data indicative of an amount of monetary savings in the financial account corresponding to the user 41 and/or deposits that likely correspond to regular income. In this way, the search device 12 may carry out a searching procedure that prioritizes houses for sale in a monetary range reasonable for the user 41. In some embodiments, the search engine may require that the user 41 (and, in some embodiments, the additional user 43) consent to the search device 12 having access to the online financial account, or any other account (e.g., online social media account, online retail account, etc.) hosted on one or more of the servers 56 in the server assembly 54 or otherwise associated with the user 41 and/or the additional user 43. Indeed, the previously described features relating to a linkage or connection between two search engine accounts may require that the users (e.g., the user 41 and the additional user 43) consent to the linkage or connection.

In general, and as detailed above, the search device 12 receives a first input indicative of a search term (e.g., string) from the user device 22, and one or more additional data points (or inputs) from the user device 22, the additional user device 42, one or more of the servers 56 corresponding to the server assembly 54, another source, or any combination thereof. The additional data points (or inputs) may relate to the user 41 of the user device 22 or another user (e.g., the additional user 43) associated with the user 41, and may include, for example, financial information (e.g., savings amount, credit amount, debt amount, credit score, recent expenditures, types of purchased products or services, locations of purchases, recent income sources, etc.), scheduling or calendaring information (e.g., appointments, appointment times, appointment locations, meetings, meeting times, meeting locations, etc.), insurance information (e.g., data indicative of a coverage type, a coverage amount, a coverage area, a premium, a deductible, etc.), social media information (e.g., comments, likes, friends lists, other interactions, etc.), retail information (e.g., purchases, expenditures, memberships, etc.), and the like. The same or similar information may be derived from accounts associated with the additional user 43, assuming said information is accessible by the search device 12 (e.g., via an authorized linkage between the search engine account of the user 41 and the other account[s] of the additional user 43). As described in detail below and previously described above, the search device 12 determines search results based on the search term (e.g., string) received from the user device 22 and the one or more additional data points.

For example, the search device 12 employs the search term and the one or more additional data points describes above to search one or more databases 70. For brevity, "the database 70" is used below, but it should be understood that multiple databases may be employed. In general, the computing assembly 10 may include a component (e.g., the search device 12 and/or separate devices) that periodically downloads information, for example from various sources accessible via the Internet 20, and indexes the downloaded information in the database 70. In the illustrated embodiment, information is downloaded from the server assembly 54 and indexed in the database 70. Indeed, while certain servers 56 of the server assembly 54 may be employed to provide certain of the above-described additional data points (e.g., relatively private data or information corresponding to the user 41 and/or the additional user 43), such as the first server 56a and the second server 56b, certain other ones of the servers 56 may be employed to host websites accessible via the Internet 20, such as the third server 56c, the fourth server 56d, the fifth server 56e, and the sixth server 56f.

As an example, the third server 56c may host a website corresponding to a Mexican food restaurant. Over time, information related to the website (e.g., a domain name, a URL, a summary of a purpose of the website, hours of operation, quoted text from the website, etc.) may be downloaded from the third server 56c and indexed in the database 70. As another example, the fourth server 56*d* may host an additional website corresponding to an additional Mexican food restaurant. Over time, information related to the additional website (e.g., a domain name, a summary of a purpose of the website, hours of operation, quoted text from the website, etc.) may be downloaded from the fourth server 56*d* and indexed in the database 70. This downloading and indexing procedure may be referred to as "web crawling."

The search device 12 may employ the search term received from the user device 22 (e.g., "Mexican food restaurant"), one or more additional data points received from the user device 22 or another source, such as the additional user device 42 (e.g., a previous payment to a Mexican restaurant, an enchilada preference of the additional user 43, a scheduled dinner appointment between the user 41 and the additional user 43, etc.), and search the information indexed in the database 70 based on the search term and the one or more additional data points. In some embodiments, the search device 12 may generate a relevancy score for various instances of related information identified by the search device 12 in the database 70. For example, the search device 12 may identify that first data indexed in the database 70 and indicative of the Mexican food restaurant website hosted on the third server 56*c* does not serve enchiladas, and the search device 12 may identify that second data indexed in the database 70 and indicative of the additional Mexican food restaurant web site hosted on the fourth server 56*d* serves enchiladas. Accordingly, the search device 12 may determine, calculate, or assign a first score to the first data and a second score to the second data, where the second score is higher than the first score (e.g., on the basis of the second Mexican food restaurant serving enchiladas). Other analysis may also be employed, such as determining a correspondence between a time of the dinner appointment and hours of operation of the first and second Mexican food restaurants. Examples of a scoring algorithm for scoring a relevancy of various information identified in the database 70 will be provided with reference to later drawings.

After identifying the relevant search results and determining relevancy scores for various portions of the search results, the search device 12 may present the search results on the display 30 of the user device 22, where the search results are ranked in order of relevancy. That is, the second data indicative of the additional Mexican food restaurant website hosted on the fourth server 56*d* may be presented at a top of the search results on the display 30 of the user device 22 (e.g., based on the additional Mexican food restaurant having an enchiladas plate), whereas the first data indicative of the Mexican food restaurant website hosted on the third server 56*c* may be presented after the second data in the search results on the display 30 of the user device 22. In this way, the additional data points (e.g., the enchilada preference of the additional user 43, a time of the dinner appointment, etc.) received, for example, from the user device 22 and/or the additional user device 42 may enable customized results that take into account a higher volume of search parameters than employed in traditional embodiments. Of course, as previously described, any number of additional data points (or inputs) may be employed, and may relate to the user 41, the additional user 43, and/or other related search parameters.

As previously described, certain of the one or more additional data points may be derived from an online account connected or linked with the search engine account of the user 41. In some embodiments, one of the servers 56 of the server assembly 54, such as the fifth server 56*e*, may be employed to store data related to various online accounts, links or connections between the various online accounts, and the like. In this way, the search device 12 may receive the search term via the user device 22 and the search engine account corresponding to the user 41, and then receive one or more additional data points corresponding to an additional online account (e.g., an additional search engine account of the additional user 43) and stored in the fifth server 56*e*. In some embodiments, the user 41 and/or the additional user 43 are prompted by the search engine to consent to (or authorize) access to various accounts and/or information employed for providing additional data points to the search device 12. These and other features are described in detail below with respect to FIG. 2.

Figure 2:
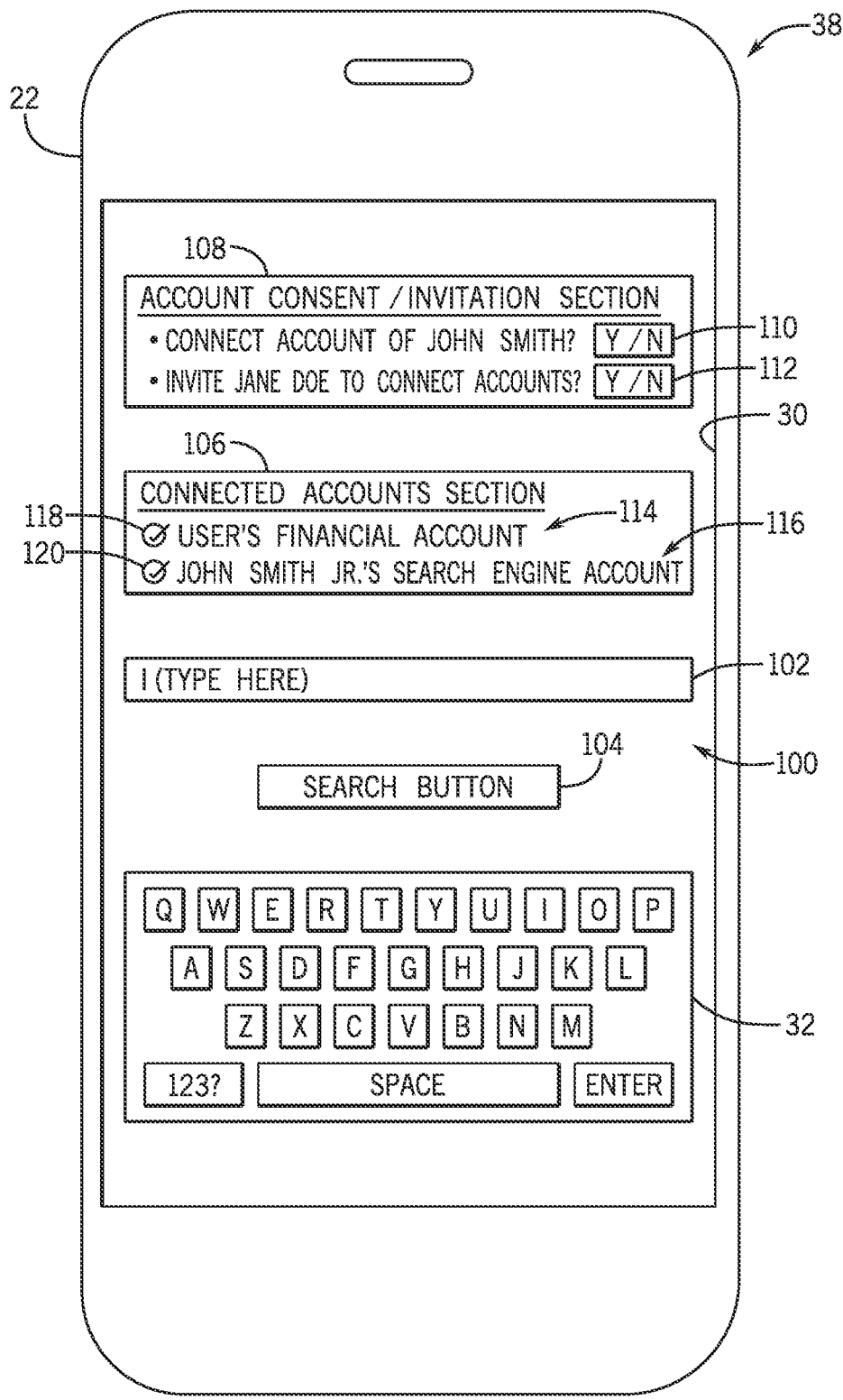
FIG. 2 is a schematic illustration of a graphical user interface on a display of a user device of the search engine computing assembly of FIG. 1, the graphical user interface including a user input section, a connected account section, and an account consent/invitation section, in accordance with an aspect of the present disclosure.

FIG. 2 is a schematic illustration of an embodiment of a graphical user interface 100 presented on the display 30 of the user device 22 of the computing assembly 10 in FIG. 1. The user device 22 in the illustrated embodiment may be, for example, the smartphone 38 illustrated in FIG. 1. Thus, the display 30 may include a touchscreen having a digital keyboard corresponding to the input component 32 of the user device 22.

As shown, the graphical user interface 100 includes a user input section 102 configured to receive a search term via the input component 32. The graphical user interface 100 also includes a search button 104 utilized after entry of the search term to the user input section 102, and configured to prompt the search engine to process the search term and generate various search results in accordance with the present disclosure.

The graphical user interface 100 also includes a connected accounts section 106 and an account consent/invitation section 108. These may show connected accounts (e.g., a connected checking account of the user) and/or pending connections (e.g., a connection to an insurance account of the user that is pending user approval via the insurance company's application). The account consent/invitation section 108 may be employed to enable a user of the user device 22 to consent to (or authorize) connecting various accounts to the search engine account of the user, and/or to invite an additional user having an additional search engine account to connect said additional search engine account of the additional user with the search engine account of the user. For example, the account consent/invitation section 108 in the illustrated embodiment includes a first option 110 for connecting the user's search engine account with a search engine account corresponding to John Smith. The account consent/invitation section 108 in the illustrated embodiment also includes a second option 112 for inviting Jane Doe to connect Jane Doe's search engine account with the search engine account of the user. Other account connections are also possible, such as connecting a social media account of the user with the search engine account of the user, a social media account of an additional user with the search engine account of the user, etc. In some embodiments, such as those seeking to connect two accounts of two separate parties, consent or authorization may be required from both of the two separate parties.

The connected accounts section 106 in the search engine portal displayed on the graphical user interface 100 may include a list of all accounts connected with the user's search engine account. For example, in the illustrated embodiment, a first connection 114 between the user's search engine account and the user's financial account is shown, and a second connection 116 between the user's search engine account and John Smith Jr.'s search engine account is shown. Further, in the illustrated embodiment, the user may select whether the first connection 114, the second connection 116, or both are utilized to provide additional data points to the search engine for contextualizing the search of the search term input to the search input section 102 via the input component 32. For example, a first selection 118 corresponding to the first connection 114 and a second selection 120 corresponding to the second connection 116 is illustrated in FIG. 2. If the user prefers that the search of the search term be conducted without the use of the first connection 114, for example, the user can toggle off the first selection 118 corresponding to the first connection 114. With the first selection 118 and the second selection 120 toggled on as shown, the search engine may receive additional data points (or inputs) from the user's financial account (via the first connection 114) and John Smith Jr.'s search engine account (via the second connection 116) to improve a volume of data employed in searching a database (e.g., the database 70 in FIG. 1) based on the search term, as previously described.

Figure 3:
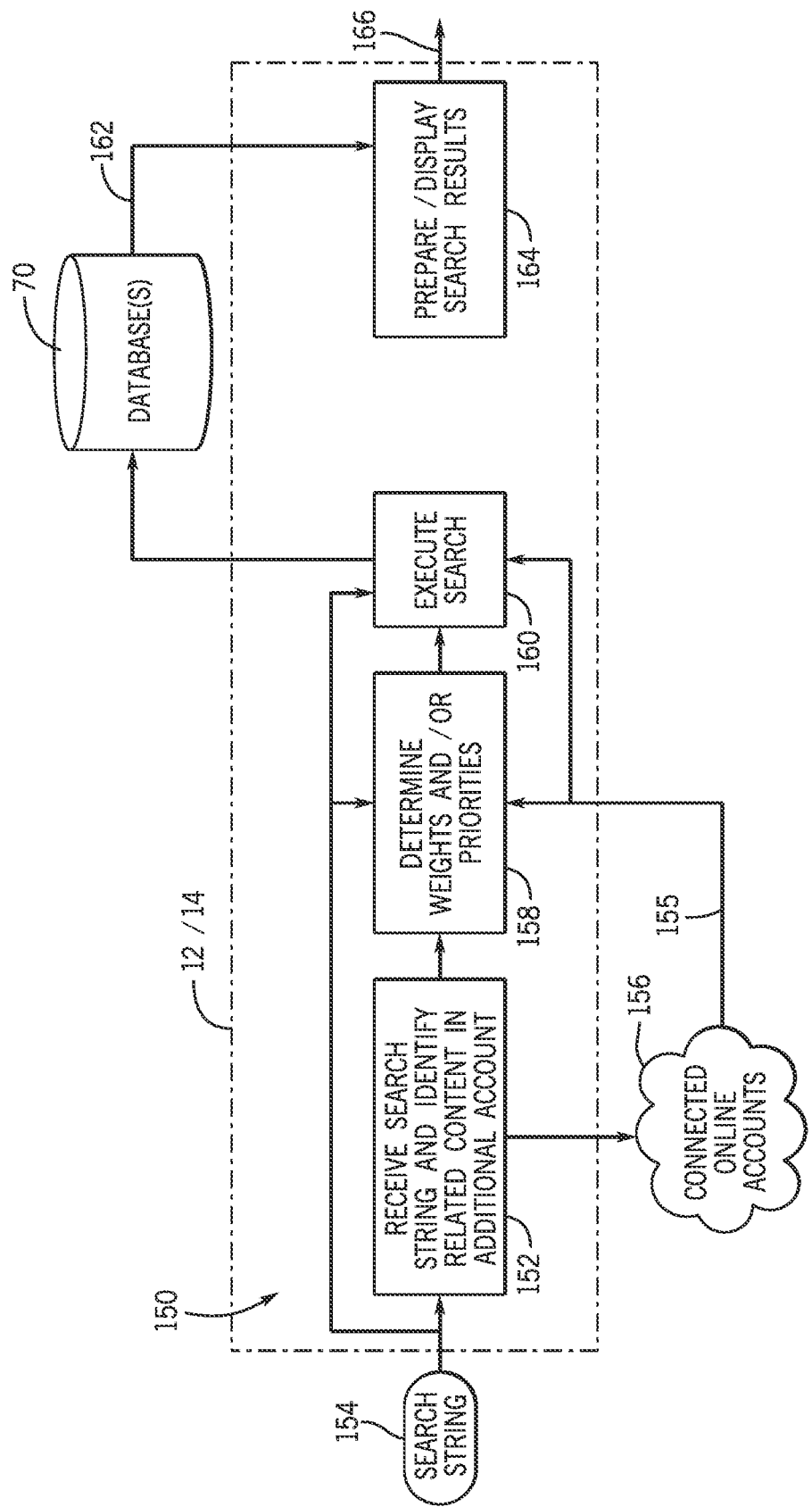
FIG. 3 is a schematic illustration of an algorithm executed by a search device of the search engine computing assembly of FIG. 1, in accordance with an aspect of the present disclosure.

FIG. 3 is a schematic illustration of an embodiment of an algorithm 150 executed by the search device 12 (e.g., processing circuitry 14) of the search engine computing assembly 10 of FIG. 1. In the illustrated embodiment, the algorithm 150 includes receiving (block 152) a search string 154 (e.g., via a user of a search engine account) and identifying related content 155 in additional online accounts 156 (e.g., connected with the search engine account). Examples of various additional online accounts 156 are provided above with reference to FIG. 1.

The algorithm 150 also includes determining (block 158) weights and/or priorities for the search string 154 and the related content 155. For example, the related content 155 may be more relevant to the search string 154 in certain instances than others. As an example, the search string 154 entered by the user includes "automobiles for sale with high gas mileage" and the related content 155 identified from the connected online account(s) 156 may include a purchase of a particular hybrid vehicle by an additional user having an account connected with the account of the user. In this instance, the algorithm 150 may include assigning a higher weight or priority to the related content 155 (i.e., the purchase of the particular hybrid vehicle) than if the related content 155 included, for example, a purchase a strictly gas powered four door sedan. In this way, a first portion of a relevancy score for various items identified in a searching procedure (described in detail below) may correspond to the search string 154 itself, and a second portion of the relevance score may correspond to the related content 155 identified from the connected online account(s) 156, where weights or priorities of the first portion and the second portion can be modulated at block 158 as described above.

The algorithm 150 also includes executing (block 160) a search procedure, in which the algorithm 150 employs the search string 154, the related content 155, and the weights or priorities determined at block 158 to identify search result items 162 located in the database 70. For example, as previously described, the database 70 may include data indicative of various online websites stored and indexed thereon over time (e.g., via web crawling). As part of the search procedure at the block 160, the algorithm 150 may include scoring a relevancy of each of the search result items 162, as previously described. The search results items 162 may then be ranked in order of relevancy as the algorithm 150 prepares and/or displays (block 164) the search results. In some embodiments, the algorithm 150 includes a search results output 166 to, for example, a device of the user that entered the search string 154. In some embodiments, the relevancy score may be based on a first component indicative of a relevancy of various search result items to the search string 154 and a second component indicative of a relevancy of various search result items to the related content 155.

Figure 4:
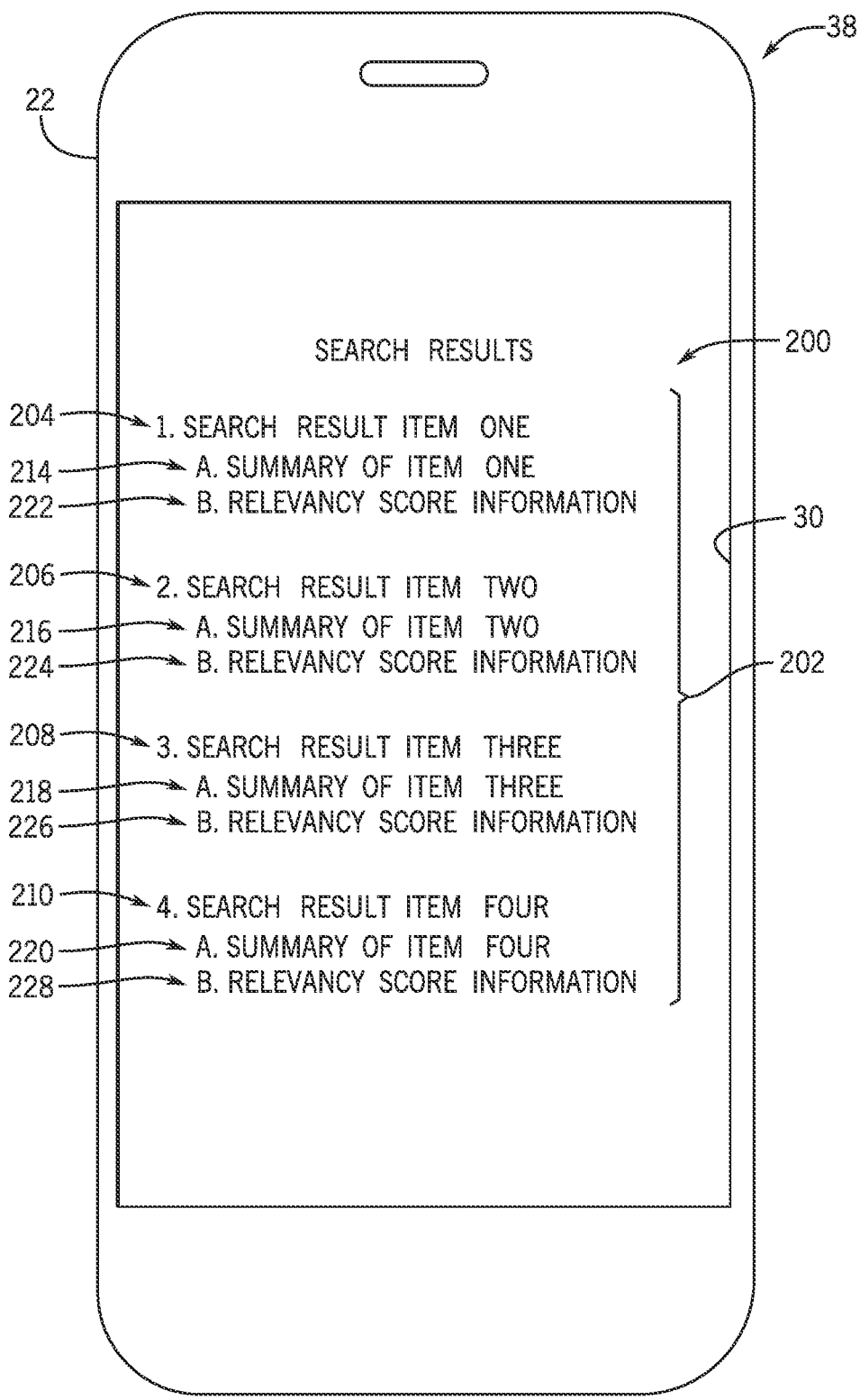
FIG. 4 is a schematic illustration of an additional graphical user interface on a display of a user device of the search engine computing assembly of FIG. 1, the additional graphical user interface including a list of search results, in accordance with an aspect of the present disclosure.

FIG. 4 is a schematic illustration of an embodiment of another graphical user 200 interface presented on the display 30 of a user device 22 of the search engine computing assembly 10 of FIG. 1. The user device 22 in the illustrated embodiment may be, for example, the smartphone 38 illustrated in FIG. 1. Thus, the display 30 may include a touchscreen. As shown, the graphical user interface 200 may include a list 202 of search result items 204, 206, 208, 210 ordered by relevancy score. Each item 204, 206, 208, 210 may include a summary 212, 214, 216, 218 of the corresponding item 204, 206, 208, 210, respectively. For example, the summary 212 of the first search result item 204 may include a name of a company corresponding to the first search result item 204, products or services offered by the company, etc.

Further, each item 204, 206, 208, 210 may include corresponding relevancy score information 222, 224, 226, 228. The relevancy score information 222, 224, 226, 228 may include, for example, an overall relevancy to the search string and previously described related content (or additional data points) received from various connected accounts, and/or a breakdown of how the items 204, 206, 208, 210 correspond to each of the search string and the previously described related content (or additional data points) received from various connected accounts. As previously described, when first requesting a search, a user may be capable of selecting connected accounts utilized to contextualize the search. By including the relevancy score information 222, 224, 226, 228 as described above, the user may be capable of identifying how various connected accounts are affecting search results, and utilize this understanding in subsequent searches to select which (if any) connected accounts are utilized to contextualize said subsequent searches. For example, a user may identify that certain exercise clothing was highlighted or prioritized in a clothing search based on a link to an insurance account that tracks user exercise and indicates that the user may prefer exercise clothes as someone that exercises more than average.

Figure 5:
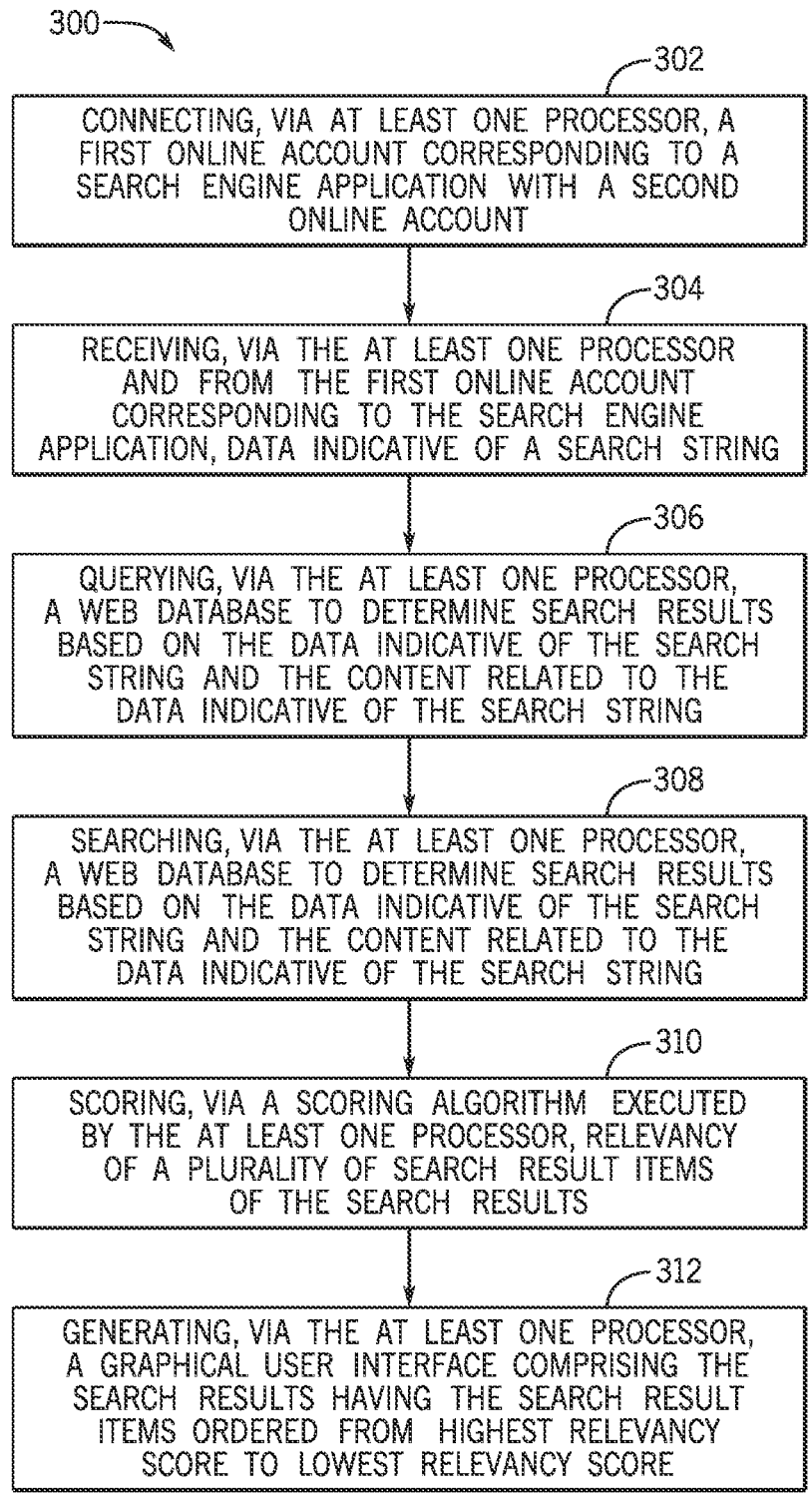
FIG. 5 is a process flow diagram illustrating a method of operating a search engine via the search engine computing assembly of FIG. 1, in accordance with an aspect of the present disclosure.

FIG. 5 is a process flow diagram illustrating an embodiment of a method 300 of operating a search engine via the search engine computing assembly 10 of FIG. 1. In the illustrated embodiment, the method 300 includes connecting (block 302), via at least one processor, a first online account corresponding to a search engine application with a second online account. In some embodiments, connecting the first online account with the second online account may include receiving authorization from a user of the first online account, a user of the second online account, or both. The online accounts that may be connected with the first online account corresponding to the search engine application may include, for example, a second online search engine account, a social media account, a financial institution account, a health/fitness/nutrition account, a calendar or scheduling account, an entertainment account, a retail account, etc.

The method 300 also includes receiving (block 304), via the at least one processor and from the first online account corresponding to the search engine application, data indicative of a search string. For example, as previously described, the search string may include a word, a phrase, Boolean logic, etc.

The method 300 also includes querying (block 306), via the at least one processor, the second online account for content related to the data indicative of the search string. As an example, the search string may be "movie times Friday night." The at least one processor may utilize the search string to locate, in a second online account corresponding to a calendar or scheduling application, an appointment between the user and an additional user to watch a movie at 7:00 pm on Friday night. The appointment may be employed as related content (referred to in certain instances of the present disclosure as additional information or additional inputs) during a searching procedure, for example, described in detail below. That is, the searching procedure may place a priority or emphasis on movies showing at approximately 7:00 pm on Friday.

The method 300 also includes searching (block 308), via the at least one processor, a web database to determine search results based on the data indicative of the search string and the content related to the data indicative of the search string. For example, the web database may include information indicative of multiple movie theaters proximate the user and/or additional user (and corresponding show times). The at least one processor may locate movie show times at the multiple movie theaters and corresponding to Friday night. As previously described, the at least one processor may utilize the related content (e.g., the appointment to watch a movie at 7:00 pm on Friday night) to contextualize the search. That is, the at least one processor may place an emphasis on movie theaters having movies showing at approximately 7:00 pm on Friday night. As another example, previously visited movie theatres (based on purchase receipts identified in a financial account) may be prioritized based on the user frequenting the previously visited movie theatres.

The method 300 also includes scoring (block 310), via a scoring algorithm executed by the at least one processor, a relevancy score of a plurality of search result items of the search results. For example, as previously described, the relevancy score may be based on a correspondence of the search string to the search result item and a correspondence of the related content to the search result item. A weight or priority of the search string and a weight or priority of the related content may be modulated based on, for example, a strength of a correspondence between the search string and the related content, a strength of a correspondence between the search string and the search result item, a strength of a correspondence between the related content and the search result item, or other conditions in accordance with the present disclosure. As previously described, the method 300 also includes generating (block 312), via the at least one processor, a graphical user interface comprising the search results having the search result items ordered from highest relevancy score to lowest relevancy score. Further, as previously noted, information for auditing the scoring process may be provided (e.g., indications of what influenced the ranking may be provided), which may allow the user to adjust or edit the process for better results.

Presently disclosed systems and methods may be employed to improve, relative to traditional embodiments, accuracy, relevance, and usefulness of search results generated by a search engine. Indeed, the search engine may receive various data points in addition to a search term (e.g., string) to customize search results for a particular user.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more databases having first data indicative of a plurality of online websites indexed therein; and
one or more processors configured to:
receive, via an input section corresponding to a search engine account of a search engine application operable on a user device, second data indicative of a search string;
determine an additional online account linked with the search engine account;
locate, in the additional online account and based on the second data, third data correlated to the search string;
search the one or more databases to locate a subset of the first data by identifying a correspondence between the subset of the first data and a combination of the second data and the third data; and
format, based on the subset of the first data, search results displayable on a display of the user device.

2. The system of claim 1, wherein the one or more processors is configured to receive, from the user device, an additional user device, or both, authorization to link the search engine account with an online financial institution account corresponding to the additional online account.

3. The system of claim 2, wherein the one or more processors is configured to locate, in the online financial institution account corresponding to the additional online account, purchase history data corresponding to the third data correlated to the search string.

4. The system of claim 1, wherein the one or more processors is configured to receive, from the user device and from an additional user device associated with an additional search engine account corresponding to the additional online account, authorization to link the search engine account with the additional search engine account.

5. The system of claim 1, wherein the one or more processors is configured to receive, from the user device, an additional user device, or both, authorization to link the search engine account with an online calendaring or scheduling account corresponding to the additional online account.

6. The system of claim 1, wherein the one or more processors is configured to receive, from the user device, an additional user device, or both, authorization to link the search engine account with an online health, nutrition, and/or fitness account corresponding to the additional online account.

7. The system of claim 1, wherein the one or more processors is configured to determine the additional online account linked with the search engine account by:
determining first identification information of the search engine account;
determining second identification information of the additional online account; and determining a correspondence between the first identification information and the second identification information;

generating, based on the correspondence, a link between the search engine account and the additional online account; and confirming the link in response to receiving, via the input section corresponding to the search engine account of the search engine application operable on the user device, the second data indicative of the search string.

8. The system of claim 1, wherein the one or more processors is configured to:

score, via a scoring algorithm that receives the second data and the third data, a plurality of search result items from the subset of the first data; and format, based on the subset of the first data, the search results displayable on the display of the user device by generating a search results list having the plurality of search result items ordered from highest score to lowest score.

9. The system of claim 8, wherein the one or more processors is configured to score, based on the subset of the first data and the scoring algorithm that receives the second data and the third data, the plurality of search result items by:

applying a first weight or first priority to the second data; and applying a second weight or second priority to the third data, wherein the second weight or the second priority is different than the first weight or the first priority, respectively.

10. A computer-implemented method, comprising:

receiving, from at least one user device and via processing circuitry comprising at least one processor, authorization to connect a first online account corresponding to a search engine application with a second online account;

connecting, via the processing circuitry and based on the authorization, the first online account corresponding to the search engine application with the second online account;

receiving, via the processing circuitry and from the first online account corresponding to the search engine application, data indicative of a search string;

querying, via the processing circuitry, the second online account for content related to the data indicative of the search string;

searching, via the processing circuitry, a web database to determine search results based on the data indicative of the search string and the content related to the data indicative of the search string; and generating, via the processing circuitry, a graphical user interface comprising the search results.

11. The computer-implemented method of claim 10, comprising receiving, from the at least one user device and via the processing circuitry, the authorization to connect the first online account corresponding to the search engine application with an online financial institution account corresponding to the second online account.

12. The computer-implemented method of claim 11, comprising receiving, via the processing circuitry and from the online financial account corresponding to the second online account, purchase history data corresponding to the content related to the data indicative of the search string.

13. The computer-implemented method of claim 10, comprising receiving, from the at least one user device and via the processing circuitry, the authorization to connect the first online account corresponding to the search engine application with a social media account corresponding to the second online account.

14. The computer-implemented method of claim 10, comprising:

scoring, via a scoring algorithm executed by the processing circuitry such that the scoring algorithm receives the data indicative of the search string and the content related to the data indicative of the search string, a plurality of search result items of the search results; and generating, via the processing circuitry, a graphical user interface comprising the search results such that the plurality of search result items is ordered from highest score to lowest score in a search results list on the graphical user interface.

15. The computer-implemented method of claim 14, comprising generating, via the processing circuitry, the graphical user interface comprising the search results such that each search result item of the plurality of search result items includes additional data indicative of a relevancy score including a first relevancy score component corresponding to the data indicative of the search string and a second relevancy score component corresponding to the content related to the data indicative of the search string.

16. One or more tangible, non-transitory, computer-readable media storing instructions stored thereon that, when executed by processing circuitry comprising one or more processors, are configured to cause the processing circuitry to:

receive, via an input section of a search engine account corresponding to a search engine application, data indicative of a search string;

receive, from a device corresponding to the search engine account, authorization to connect the search engine account with an account;

query the account connected with the search engine account for content related to the data indicative of the search string;

search a web database to determine search results based on the data indicative of the search string and the content related to the data indicative of the search string; and generate, in a search results interface of the search engine account corresponding to the search engine application, a graphical user interface presenting the search results.

17. The one or more tangible, non-transitory, computer-readable media of claim 16, wherein the instructions, when executed by the processing circuitry, are configured to cause the processing circuitry to query the account connected with the search engine account for the content related to the data indicative of the search string by:

querying a financial institution account for financial content related to the data indicative of the search string;

querying a digital calendar account for calendared content related to the data indicative of the search string;

querying an entertainment account for entertainment content related to the data indicative of the search string; or querying a smart device account for:

health content related to the data indicative of the search string; or nutrition content related to the data indicative of the search string.

18. The one or more tangible, non-transitory, computer-readable media of claim 16, wherein the instructions, when executed by the processing circuitry, are configured to cause the processing circuitry to receive, from the device corresponding to the search engine account, the authorization to connect the search engine account with an additional search engine account corresponding to the account connected with the search engine account.

19. The one or more tangible, non-transitory, computer-readable media of claim 16, wherein the instructions, when executed by the processing circuitry, are configured to cause the processing circuitry to:

score, via a scoring algorithm that receives the data indicative of the search string and the content related to the data indicative of the search string, a plurality of search result items corresponding to the search results; and generate, in the search results interface of the search engine account corresponding to the search engine application, the graphical user interface presenting the search results such that the graphical user interface includes a search results list ranking the plurality of search results items in order of highest score to lowest score.

20. The one or more tangible, non-transitory, computer-readable media of claim 19, wherein the instructions, when executed by the processing circuitry, are configured to cause the processing circuitry to score, via the scoring algorithm that receives the data indicative of the search string and the content related to the data indicative of the search string, the plurality of search result items corresponding to the search results by:

applying a first weight or first priority to the data indicative of the search string; and applying a second weight or second priority to the content related to the data indicative of the search string, wherein the second weight or the second priority is different than the first weight or the first priority, respectively.

\* \* \* \* \*